United States Patent
Takanashi et al.

(10) Patent No.: US 10,486,463 B2
(45) Date of Patent: Nov. 26, 2019

(54) HUB UNIT BEARING

(71) Applicant: NSK LTD., Tokyo (JP)

(72) Inventors: Harumi Takanashi, Fujisawa (JP); Tatsuo Wakabayashi, Fujisawa (JP)

(73) Assignee: NSK LTD., Tokyo (JP)

( * ) Notice: Subject to any disclaimer, the term of this patent is extended or adjusted under 35 U.S.C. 154(b) by 0 days.

(21) Appl. No.: 16/158,813

(22) Filed: Oct. 12, 2018

(65) Prior Publication Data

US 2019/0111732 A1 Apr. 18, 2019

(30) Foreign Application Priority Data

Oct. 16, 2017 (JP) .................................. 2017-200238

(51) Int. Cl.
*B60B 27/00* (2006.01)
*F16C 19/38* (2006.01)

(52) U.S. Cl.
CPC ........ *B60B 27/001* (2013.01); *B60B 27/0094* (2013.01); *F16C 19/386* (2013.01); *F16C 2326/02* (2013.01); *F16C 2326/05* (2013.01)

(58) Field of Classification Search
CPC .............. F16C 2326/02; F16C 2326/05; F16C 19/386; B60B 27/001; B60B 27/0094
See application file for complete search history.

(56) References Cited

U.S. PATENT DOCUMENTS

| | | | | |
|---|---|---|---|---|
| 5,975,765 A | * | 11/1999 | Kawamura | B60B 27/00 384/537 |
| 2001/0019223 A1 | * | 9/2001 | Kaneko | B60B 3/04 301/105.1 |
| 2009/0245935 A1 | * | 10/2009 | Kamikawa | B60B 7/0013 403/359.1 |
| 2011/0194797 A1 | * | 8/2011 | Yamamoto | B60B 27/00 384/569 |
| 2017/0043617 A1 | * | 2/2017 | Song | B60B 35/18 |
| 2017/0219013 A1 | * | 8/2017 | Yokota | F16C 43/04 |
| 2018/0135702 A1 | * | 5/2018 | Nakatsuji | B60B 27/00 |

FOREIGN PATENT DOCUMENTS

| | | | |
|---|---|---|---|
| JP | 2009-149142 A | | 7/2009 |
| JP | 2013221611 A | * | 10/2013 .......... F16C 33/7896 |

OTHER PUBLICATIONS

Machine Translation of JP-2013221611-A (Year: 2013).*

* cited by examiner

*Primary Examiner* — Alan B Waits
(74) *Attorney, Agent, or Firm* — Sughrue Mion, PLLC

(57) ABSTRACT

A hub unit bearing includes a stationary side raceway ring, a rotating side raceway ring including a rotating side flange for fixing a vehicle wheel, and rolling elements rollably provided therebetween. The rotating side flange includes thin portions and thick portions arranged alternately in a circumferential direction. A hub bolt is serration-fitted to a bolt hole formed in each of the thick portions. An outer peripheral surface of the rotating side flange includes a large-diameter portion which has a larger radial thickness dimension with the bolt hole, a small-diameter portion which has a smaller radial thickness dimension with the bolt hole than the large-diameter portion, and a step portion which connects the large-diameter portion to the small-diameter portion. A serration-fitted portion does not radially overlap with the large-diameter portion.

1 Claim, 5 Drawing Sheets

HUB UNIT BEARING

CROSS-REFERENCE TO RELATED APPLICATIONS

The present application claims the benefit of priority of Japanese Patent Application No. 2017-200238 filed on Oct. 16, 2017, the content of which is incorporated herein by reference.

TECHNICAL FIELD

Aspects of the present invention relates to a hub unit bearing for rotatably supporting a vehicle wheel of an automobile to a suspension device.

BACKGROUND ART

A hub unit bearing is widely used to rotatably support a vehicle wheel of an automobile and a rotating member for braking such as a brake rotor to a suspension device. For example, in a related-art hub unit bearing described in JP-A-2009-149142, a hub which is a rotating side raceway ring is rotatably supported by a plurality of rolling elements on an inner diameter side of an outer ring which is a stationary side raceway ring. The hub includes a rotating side flange having an outward flange shape for supporting and fixing a vehicle wheel on an outer peripheral surface thereof.

Referring to FIGS. 5A and 5B, a related-art rotating side flange 50 is formed with a bolt hole 54 axially penetrating the rotating side flange 50. A wheel configuring a vehicle wheel (not shown) and a brake rotor configuring a braking device are supported and fixed by a hub bolt 57 fixed to the bolt hole 54. The hub bolt 57 is press-fitted and fixed with the rotating side flange 50 by serration-fitting into the bolt hole 54 having the serration portion 58. A radially outer portion of the bolt hole 54 has a stepped shape where a large-diameter portion 51 having a large outer diameter dimension is connected to a small-diameter portion 53 having a small outer diameter dimension by a step portion 52. Further, a mounting side chamfer 55 and a counter-mounting side chamfer 56 are formed on both opening portions of the bolt hole 54, respectively. The mounting side chamfer 55 on a side mounted with the brake rotor is corner chamfered at two stages, so that the flange vibration accuracy of the rotation side flange 50 is improved and the occurrence of brake judder is reduced.

In the above related-art hub unit bearing, it is difficult to ensure the form deviation and the dimensional accuracy of the bolt hole 54 formed in the rotating side flange 50 by drilling.

That is, a radial thickness dimension (thickness) of a portion of the bolt hole 54 on an outer diameter side becomes thick at a portion radially overlapping with the large-diameter portion 51 and becomes thin at a portion radially overlapping with the small-diameter portion 53 with the step portion 52 as a boundary. Therefore, the rigidity around the bolt hole 54 also increases at the large-diameter portion 51 and decreases at the small-diameter portion 53. Therefore, the bolt hole 54 may be bent radially outward from the vicinity of the step portion 52, and an inner diameter dimension of the bolt hole 54 may change from the vicinity of the step portion 52 (the large-diameter portion 51 has a larger inner diameter dimension than the small-diameter portion 53). The fitting portion X1 where the serration portion 58 of the hub bolt 57 is serration-fitted to the bolt hole 54 extends over the step portion 52 and radially overlaps with both the large-diameter portion 51 and the small-diameter portion 53.

When the bolt hole 54 is bent in a middle, the hub bolt 57 press-fitted (serration-fitted) to the bolt hole 54 may be inclined. Therefore, the workability during the operation of mounting the wheel configuring the vehicle wheel and the rotating member for braking may be reduced. Further, when a tightening state of a nut is controlled by a level of a tightening torque, a variation in an axial force corresponding to the level of the tightening torque may increase and unnecessary stress may tend to act on the bolt.

When the inner diameter dimension of the bolt hole 54 changes in a middle, a fitted state of the serration portion 58 formed on an outer peripheral surface of the hub bolt 57 and an inner peripheral surface of the bolt hole 54 becomes loose at the large-diameter portion 51 and becomes strong at the small-diameter portion 53. Therefore, a fitting force may become unstable at the fitting portion.

SUMMARY

In view of the above circumstances, an aspect of the present invention provides a structure of a hub unit bearing where a hub bolt used for fixing a vehicle wheel or a rotating member for braking to a rotating side flange can be stably serration-fitted to a bolt hole.

According to an embodiment of the present invention, there is provided a hub unit bearing including:

a stationary side raceway ring which includes a stationary side raceway on a peripheral surface thereof;

a rotating side raceway ring which includes a rotating side raceway on a peripheral surface thereof and a rotating side flange for fixing a vehicle wheel; and a plurality of rolling elements which are rollably provided between the stationary side raceway and the rotating side raceway.

The rotating side flange is formed in a plate shape as a whole and includes a plurality of thin portions and a plurality of thick portions arranged alternately in a circumferential direction. Each thick portion has a larger axial thickness dimension than the thin portions.

The hub bolt is serration-fitted to a bolt hole formed in each of the thick portions.

An outer peripheral surface of the rotating side flange includes a large-diameter portion which has a larger radial thickness dimension with the bolt hole, a small-diameter portion which has a smaller radial thickness dimension with the bolt hole than the large-diameter portion, and a step portion which connects the large-diameter portion to the small-diameter portion.

A serration-fitted portion does not radially overlap with the large-diameter portion.

According to the above hub unit bearing, the hub bolt used for fixing the vehicle wheel or the rotating member for braking to the rotating side flange can be stably serration-fitted to the bolt hole.

BRIEF DESCRIPTION OF DRAWINGS

FIG. 5A is a partial cross-sectional view of a rotating side flange, and FIG. 5B a partial cross-sectional view of a bolt hole.

DESCRIPTION OF EMBODIMENTS

First Embodiment

A first embodiment of the present invention will be described with reference to FIGS. 1 and 2. A hub unit bearing 1 of this embodiment is configured to rotatably support a wheel configuring a vehicle wheel and a rotating member for braking (a brake rotor) to a knuckle configuring a suspension device. Specifically, the hub unit bearing 1 rotatably supports a hub 3 which is a rotating side raceway ring on an inner diameter side of an outer ring 2 which is a stationary side raceway ring via a plurality of balls 4 which are rolling elements.

Figure 1:
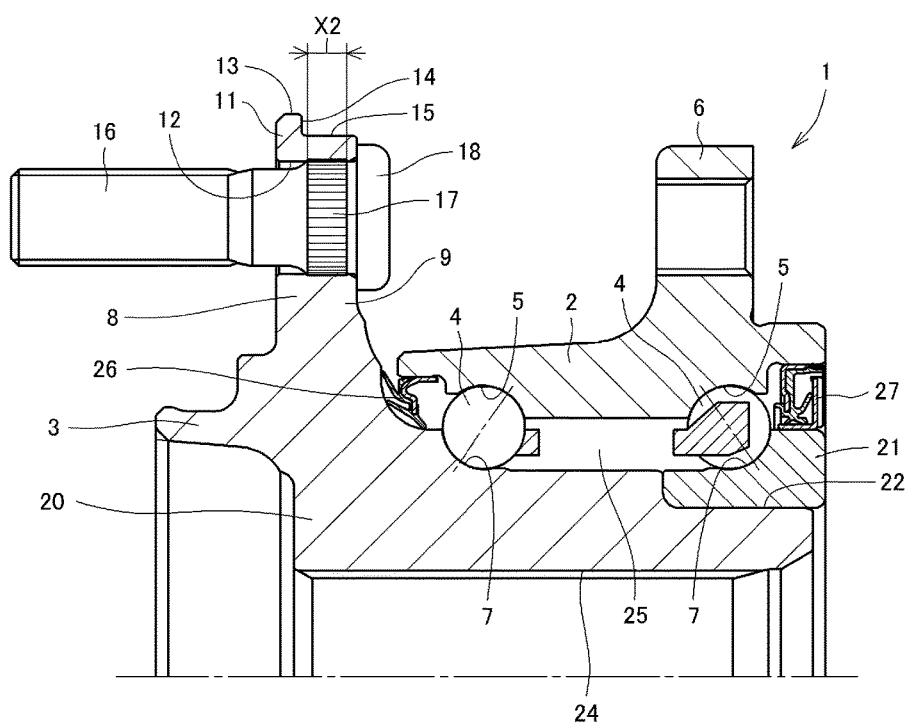
FIG. 1 is a cross-sectional view of a hub unit bearing according to a first embodiment.
Figure 2:
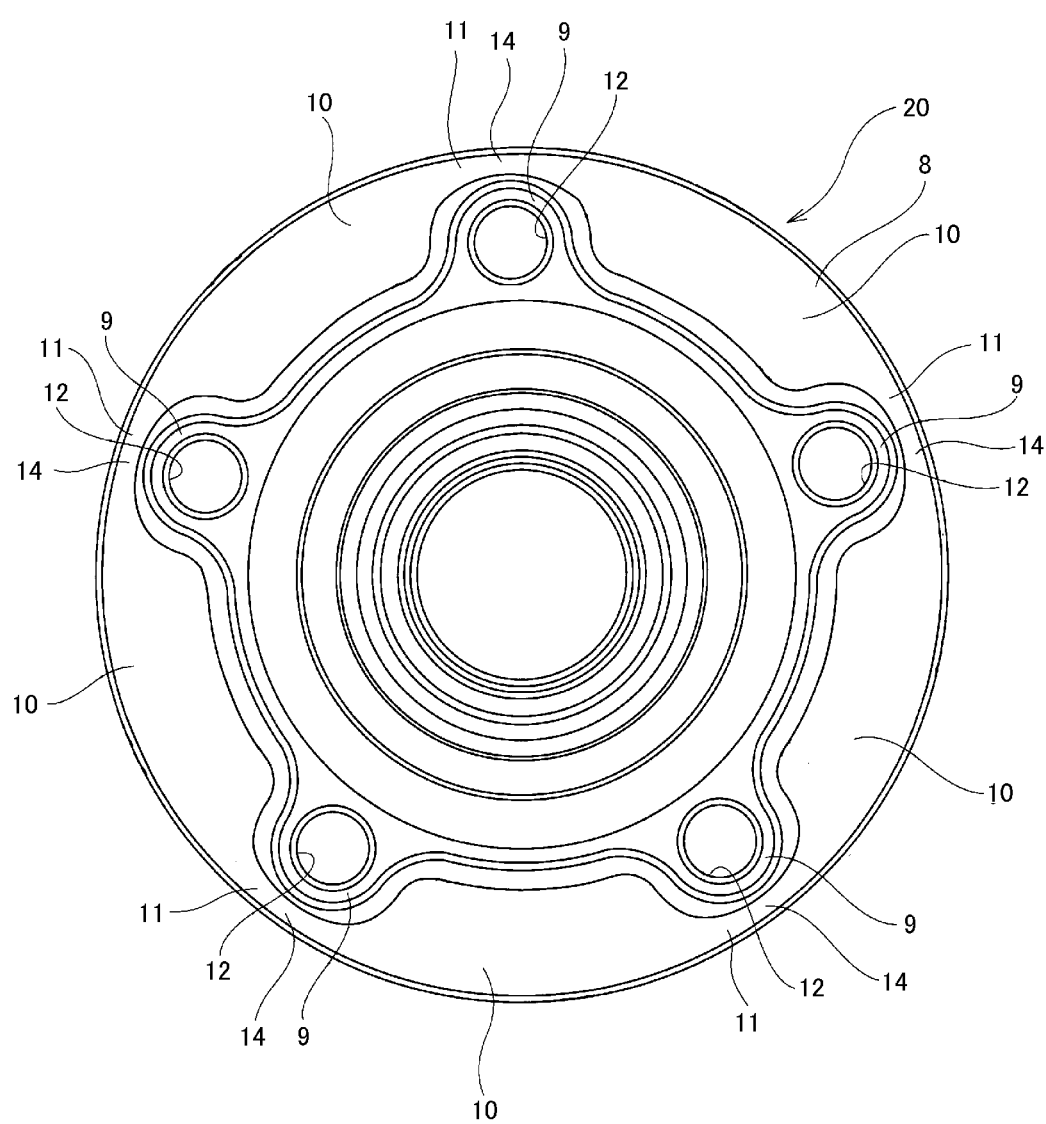
FIG. 2 is a view of a hub body taken out from FIG. 1 and seen from an axially inboard side.
Figure 3:
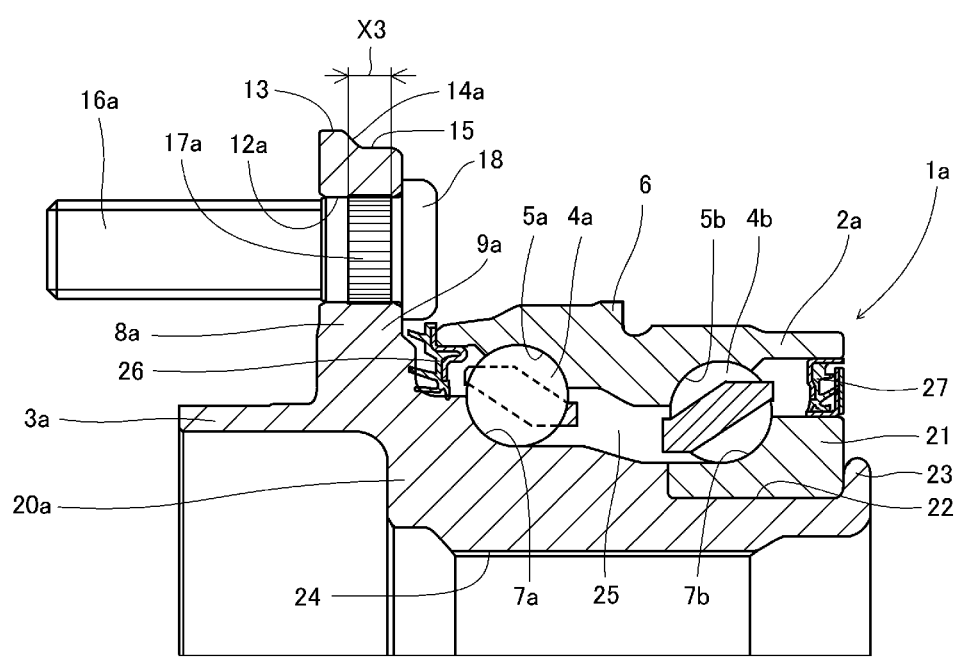
FIG. 3 is a cross-sectional view of a hub unit bearing according to a second embodiment.
Figure 5A:
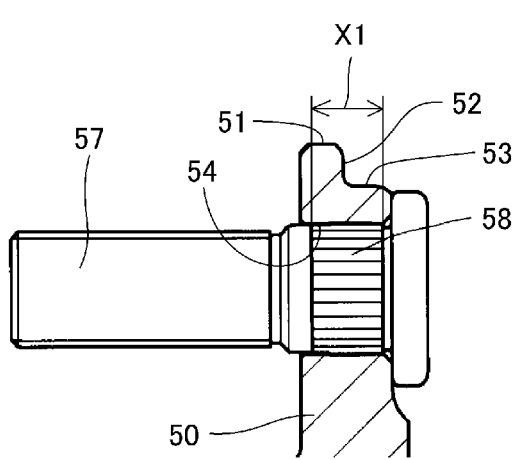
FIGS. 5A and 5B show an example of a related-art hub bearing unit.
Figure 5B:
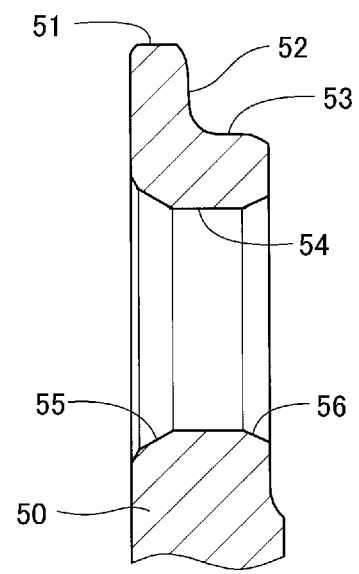

Incidentally, "outboard" in an axial direction refers to a left side in FIGS. 1, 3 and 5, which is an outboard side in a vehicle width direction in an assembled state to the vehicle, and "inboard" in the axial direction refers to a right side in FIGS. 1, 3 and 5, which is a center side in the vehicle width direction in the assembled state to the vehicle.

The outer ring 2 is formed of an iron-based alloy such as medium carbon steel and formed in a substantially cylindrical shape as a whole. The outer ring 2 includes double row outer ring raceways 5 on an inner peripheral surface and a stationary side flange 6 on an outer peripheral surface. The outer ring 2 is fixed to a knuckle (not shown) by a bolt screwed into a screw hole formed in the stationary side flange 6.

The hub 3 is configured to combine a hub body 20 and an inner ring 21, and includes double row inner ring raceways 7 and a rotating side flange 8 having an outward flange shape on an outer peripheral surface thereof. The hub 3 rotates together with a wheel and a rotating member for braking (not shown) which are connected and fixed to the rotating side flange 8.

The hub body 20 is formed by forging a material such as medium carbon steel. The rotating side flange 8 is formed at an axially outboard end side portion, the inner ring raceway 7 in an outboard row is formed at an axially intermediate portion, and a small-diameter stepped portion 22 is formed at an axially inboard end side portion on an outer peripheral surface of the hub body 20. A spline hole 24 for inserting and fixing a drive shaft is provided at a radially center portion of the hub body 20.

The inner ring 21 is formed of high carbon chromium bearing steel such as SUJ2 and formed in an annular shape as a whole, and an inner ring raceway 7 in an inboard row is formed on an outer peripheral surface. The inner ring 21 is externally fixed to the small-diameter stepped portion 22 of the hub body 20 by an interference fit.

The balls 4 are formed of bearing steel or ceramic and are rollably provided between the double row outer ring raceways 5 and the double row inner ring raceways 7. The ball 4 is applied with a contact angle in a back-to-back arrangement together with a preload.

Both axially end openings of an internal space (a rolling element installation space) 25 between the inner peripheral surface of the outer ring 2 and the outer peripheral surface of the hub 3 are sealed by a seal ring 26 and a seal ring 27 with an encoder, respectively. The seal ring 26 is formed by vulcanizing and adhering a seal material to a metal insert internally fitted and fixed to an axially outboard end portion of the outer ring 2, and a tip edge of a seal lip provided on a seal material is brought into sliding contact with a surface of the hub 3.

The seal ring 27 with the encoder is configured by combining a seal ring, a slinger and the encoder, and a tip end of the seal lip provided in the seal ring internally fitted and fixed to an axially inboard end portion of the outer ring 2 is brought into sliding contact with a surface of the slinger externally fitted and fixed to an axially inboard end portion of the inner ring 21. An encoder for detecting a rotational speed of the vehicle wheel is supported and fixed to an axially inboard side surface of the slinger.

The rotating side flange 8 provided in the hub body 20 is formed in a disc shape as a whole, and an axially outboard surface, which is a mounting surface of the rotating member for braking, is a flat surface on an imaginary plane orthogonal to a center axis of the hub body 20. A radially center portion of the rotating side flange 8 is a thickness changing portion whose axial thickness dimension varies in the circumferential direction, and an axially inboard surface of the rotating side flange 8 has an uneven shape in the circumferential direction.

A plurality of (five in the illustrated example) thin portions 10 and a plurality of (five in the illustrated example) thick portions 9 are alternately arranged in the radially center portion of the rotating side flange 8 in the circumferential direction. The thick portion 9 has a larger axial thickness dimension than the thin portions 10. The thick portion 9 protrudes (bulging) axially inboard and extending radially. A phase of each thin portion 10 (each thick portion 9) in the circumferential direction is shifted by an equal interval of 72 degrees. The thin portion 10 extends slightly radially outward from the thick portion 9, and the thin portions 10 adjacent in the circumferential direction are continuous in the circumferential direction on the radially outer side of the thick portions 9 by thin continuous portions 11 which are parts of the thin portions 10. Therefore, the thin portions 10 (and the thin continuous portions 11) are provided continuously over the entire circumference on a radially outer end portion of the rotating side flange 8.

The axial thickness dimension of the thick portion 9 is set to about 2 to 5 times the axial thickness dimension of the thin portion 10 (three times in the illustrated example). The axial thickness dimension of the thin portion 10 is the same between a portion adjacent to the thick portion 9 in the circumferential direction of the rotating side flange 8 and a portion (the thin continuous portion 11) positioned radially outside the thick portion 9.

At a plurality of positions (five positions in the illustrated example) at equal intervals in the circumferential direction of the rotating side flange 8, portions positioned in the center in the circumferential direction of the thick portions 9 are formed with bolt holes 12 which axially penetrate the rotating side flange 8 (the thick portions 9). The bolt hole 12 has a cylindrical inner peripheral surface, and chamfers are formed at both axially end openings.

An outer peripheral surface of the rotating side flange 8 in a radially outer side portion of the bolt hole 12 has a stepped shape where a large-diameter portion 13 having a large outer diameter and a small-diameter portion 15 having a small outer diameter are connected by a step portion 14. The large-diameter portion 13 corresponds to the thin continuous portion 11 and is positioned at an axially outboard portion of the rotating side flange 8. The step portion 14 is a circular flat surface parallel to an axially outboard surface of the rotating side flange 8. The small-diameter portion 15 is an outer diameter surface of a portion of the thick portion 9 protruding (bulging) to the axially inboard side from the thin portion 10.

In order to form the above-described bolt hole 12, for example, drilling is performed by a drill from the axially outboard to the axially inboard at a portion of the rotating side flange 8 which is aligned with the thick portion 9 in the circumferential direction. The bolt hole 12 is formed by penetrating the drill through the rotating side flange 8 (the thick portion 9).

The bolt hole 12 radially overlaps with both the large-diameter portion 13 (the thin continuous portion 11) and the small-diameter portion 15 across the step portion 14 in the axial direction.

A hub bolt 16 is press-fitted and fixed to each bolt hole 12. A serration portion 17 is formed on the outer peripheral surface of the axially inboard portion of the hub bolt 16, and the serration portion 17 is serration-fitted to the inner peripheral surface of the bolt hole 12 by press-fitting the hub bolt 16 from the axially inboard side to the bolt hole 12. The hub bolt 16 is axially positioned with respect to the bolt hole 12 (the rotating side flange 8) by causing a head portion 18 of the hub bolt 16 to be in contact with the axially inboard surface of the rotating side flange 8.

After the hub bolt 16 is inserted into the through holes formed in the wheel and the rotating member for braking, a nut (not shown) is screwed to a male screw formed on a distal end portion of the hub bolt 16. Accordingly, the wheel and the rotating member for braking are fixed to the axially outboard surface of the rotating side flange 8.

In a state where the hub bolt 16 is positioned and fixed to the bolt hole 12, the step portion 14, which is a boundary position between the large-diameter portion 13 and the small-diameter portion 15, does not radially overlap with the serration portion 17 of the hub bolt 16. A fitting portion X2 where the serration portion 17 is serration-fitted to the bolt hole 12 radially overlaps only with the small-diameter portion 15. That is, the fitting portion X2 is positioned only on an inner diameter side of the small-diameter portion 15 of the thick portion 9, and does not radially overlap with the large-diameter portion 13.

An outer peripheral surface (an outer diameter surface) of the small-diameter portion 15 has a partial cylindrical shape concentric with the bolt hole 12, and the thickness between the outer peripheral surface of the small-diameter portion 15 and the inner peripheral surface of the bolt hole 12 is substantially constant in the circumferential direction and the axial direction on a portion positioned outside the bolt hole 12 in a radial direction of the rotating side flange 8. On the other hand, the thickness between the outer peripheral surface of the small-diameter portion 15 and the inner peripheral surface of the bolt hole 12 changes in the radial direction and is substantially constant in the axial direction on a portion positioned on the inner diameter side of the bolt hole 12 in the radial direction of the rotating side flange 8. However, since the radial thickness on the inner diameter side of the bolt hole 12 is sufficiently larger than the thickness on the outer diameter side, the change in thickness of the portion positioned on the inner diameter side of the bolt hole 12 hardly affects the rigidity change in a portion (a range) forming the bolt hole 12.

According to the embodiment having the above-described configuration, the hub bolt 16 used to fix the vehicle wheel or the rotating member for braking to the rotating side flange 8 can be stably serration-fitted to the bolt hole 12.

That is, in the configuration where the bolt hole 12 axially penetrates the rotating side flange 8, and the large-diameter portion 13 and the small-diameter portion 15 are provided on the outer peripheral surface of the rotating side flange 8 positioned on the outer diameter side of the bolt hole 12, the fitting portion X2 of the bolt hole 12 and the serration portion 17 of the hub bolt 16 radially overlaps only with the small-diameter portion 15, and the large-diameter portion 13 does not radially overlap with the step portion 14. Therefore, the thickness dimension of the portion present on an outer diameter side of the fitting portion X2 is constant, and the rigidity of the serration fitting portion (range) is constant in the axial direction. Therefore, when the bolt hole 12 is formed by drilling, even when the bolt hole 12 is bent or an inner diameter dimension of the bolt hole 12 changes in the vicinity of the step portion 14, the hub bolt 16 can be stably press-fitted and fixed to the bolt hole 12.

Second Embodiment

Figure 4:
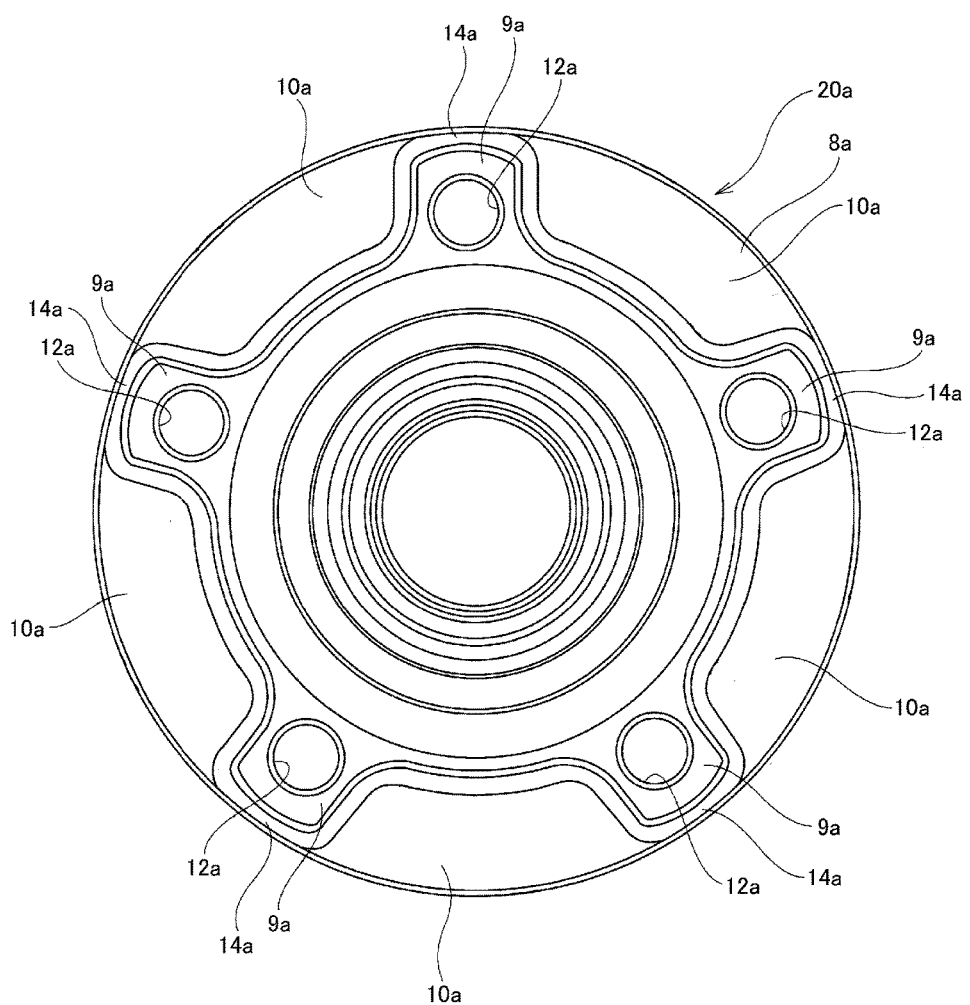
FIG. 4 is a view of a hub body taken out from FIG. 3 and seen from an axially inboard side.

A second embodiment of the present invention will be described with reference to FIGS. 3 and 4. A hub unit bearing 1a of this embodiment is of an asymmetric type, and includes an outer ring 2a which is a stationary side raceway ring, a hub 3a which is a rotating side raceway ring, and balls 4a, 4b which are rolling elements.

The outer ring 2a includes double row outer ring raceways 5a, 5b on the inner peripheral surface thereof and the stationary flange 6 on the outer peripheral surface thereof. The outer ring raceway 5a in an outboard row has a larger inner diameter dimension than the outer ring raceway 5b in an inboard row.

The outer peripheral surface of the hub 3a includes double row inner ring raceways 7a, 7b and a rotating side flange 8a for supporting and fixing the vehicle wheel. The hub 3a is configured by connecting a hub body 20a and the inner ring 21 externally fitted and fixed to the small-diameter stepped portion 22 by a crimping portion 23. The hub body 20a is formed of an iron-based alloy, and the inner ring raceway 7a in the outboard row is formed in the hub body 20a, and the inner ring raceway 7b in the inboard row is formed in the inner ring 21. The inner ring raceway 7a in the outboard row has a larger outer diameter dimension than the inner ring raceway 7b in the inboard row.

The plurality of balls 4a, 4b are rollably provided between the outer ring raceways 5a, 5b and the inner ring raceways 7a, 7b, respectively. A pitch circle diameter (PCD) of the ball 4a in the outboard row is greater than that of the ball 4b in the inboard row.

Both axially end openings of the internal space (the rolling element installation space) 25 present between an inner peripheral surface of the outer ring 2a and the outer peripheral surface of the hub 3a are sealed by the seal ring 26 and the seal ring 27 with the encoder, respectively.

The rotating side flange 8a provided on the hub 3a includes a plurality of thin portions 10a and a plurality of thick portions 9a arranged alternately in the circumferential direction. The thick portion 9a has a larger axial thickness dimension than the thin portions 10a. Unlike the first embodiment, the thin portions 10a adjacent in the circumferential direction are not continuous on a radially outer side of the thick portion 9a in the circumferential direction (the thin continuous portions 11 are not present) and are separated from each other. A bolt hole 12a is formed in a circumferential center portion of the thick portion 9a.

An outer peripheral surface of the rotating side flange 8a in a radially outer side portion of the bolt hole 12a has a stepped shape where the large-diameter portion 13 having the large outer diameter and the small-diameter portion 15 having the small outer diameter are connected by a step portion 14a. Since the step portion 14a is an inclined surface having a smaller diameter toward the axially inboard, a radial thickness dimension on an outer diameter side of the bolt hole 12a gradually decreases from the large-diameter portion 13 toward the small-diameter portion 15. Therefore, the rigidity of the bolt hole 12a on the outer diameter side is high in the large-diameter portion 13, gradually decreases in the portion of the step portion 14a, and has a constant low rigidity in the small-diameter portion 15.

The axial thickness dimension from the step portion 14a to the small-diameter portion 15 is set to about 2 to 4 times (three times in the illustrated example) the large-diameter 13, and the axial thickness dimension of the step portion 14a is substantially the same as that of the large-diameter portion 13.

According to the above embodiment, in a state where a hub bolt 16a is positioned and fixed to the bolt hole 12a, the step portion 14a connecting the large-diameter portion 13 and the small-diameter portion 15 radially overlaps with a serration portion 17a of the hub bolt 16a. A fitting portion X3 where the serration portion 17a is serration-fitted to the bolt hole 12a radially overlaps with the step portion 14a and the small-diameter portion 15, but does not radially overlap with the large-diameter portion 13. In this embodiment, the axially outboard end of the fitting portion X3 is positioned around an axial center of the step portion 14a.

According to the embodiment having the above-described configuration, similarly to first embodiment, when the bolt hole 12a is formed by drilling, the bolt hole 12a is bent in a middle or the inner diameter dimension of the bolt hole 12a changes in a middle, but the degree of change is relaxed (gradually changed) by the step portion 14a as the inclined surface. Therefore, the hub bolt 16a can be stably press-fitted and fixed to the bolt hole 12a by reducing the influence of the deterioration of the accuracy of the bolt hole 12a on the hub bolt 16a. Other configurations and effects are similar to those in the first embodiment.

The inventive concept of the present invention can be applied not only to a hub unit bearing for a driven wheel but also to a hub unit bearing for a non-driven wheel.

The invention claimed is:

1. A hub unit bearing comprising:
    a stationary side raceway ring which includes a stationary side raceway on a peripheral surface thereof;
    a rotating side raceway ring which includes a rotating side raceway on a peripheral surface thereof and a rotating side flange for fixing a vehicle wheel; and
    a plurality of rolling elements which are rollably provided between the stationary side raceway and the rotating side raceway,
    wherein the rotating side flange is formed in a plate shape as a whole and includes a plurality of first portions and a plurality of second portions thicker than the first portions, arranged alternately in a circumferential direction, each second portion having a larger axial thickness dimension than the first portions,
    wherein a hub bolt is serration-fitted to a bolt hole formed in each of the second portions,
    wherein an outer peripheral surface of the rotating side flange includes a large-diameter portion which has a larger radial thickness dimension with the bolt hole, a small-diameter portion which has a smaller radial thickness dimension with the bolt hole than the large-diameter portion, and a step portion which connects the large-diameter portion to the small-diameter portion,
    wherein the serration-fitted portion radially overlaps only with the samll diameter portion so as to not radially overlap with the large-diameter portion, and
    wherein the step portion is a circular flat surface that is parallel to an axially outboard surface of the rotating side flange.

\* \* \* \* \*